D. T. TIMBERLAKE.
CLOTHES LINE REEL AND STRETCHER.
APPLICATION FILED JAN. 19, 1914.
1,138,810.
Patented May 11, 1915.
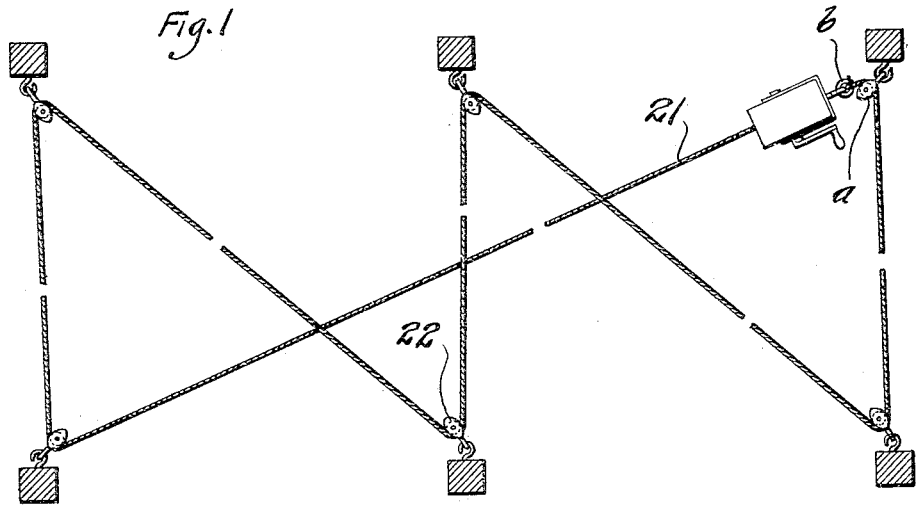
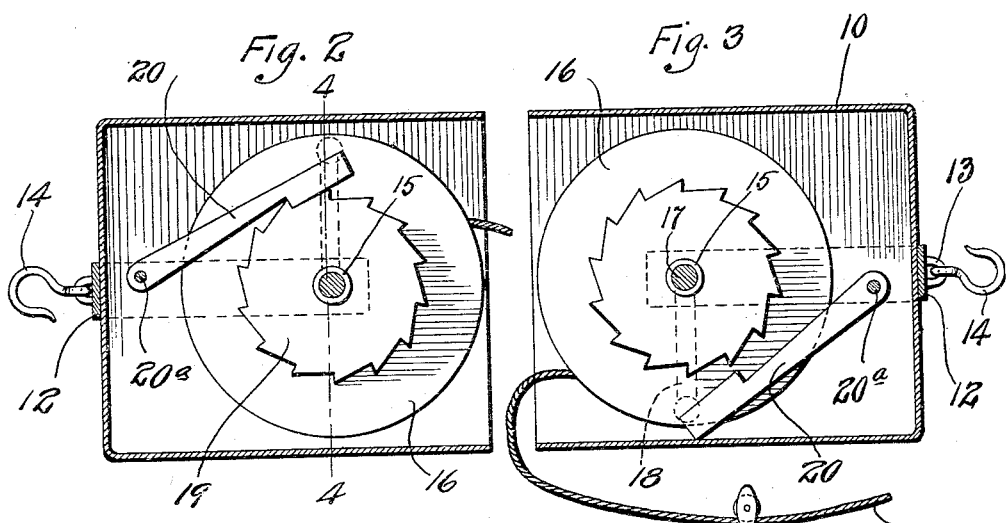
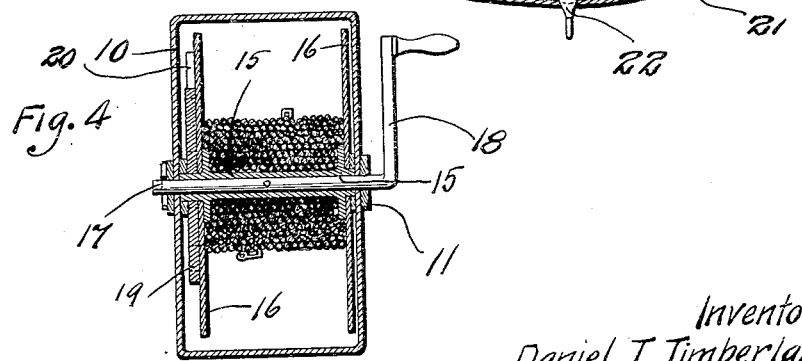
Witnesses
Wm Janus
W. P. Smith
Inventor
Daniel T. Timberlake
By J. R. Cornwall, Atty

UNITED STATES PATENT OFFICE.

DANIEL T. TIMBERLAKE, OF ST. LOUIS, MISSOURI.

CLOTHES-LINE REEL AND STRETCHER.

1,138,810.   Specification of Letters Patent.   Patented May 11, 1915.

Application filed January 19, 1914.  Serial No. 812,955.

*To all whom it may concern:*

Be it known that I, DANIEL T. TIMBERLAKE, a citizen of the United States, residing at the city of St. Louis, State of Missouri, have invented a certain new and useful Improvement in Clothes-Line Reels and Stretchers, of which the following is a full, clear, and exact description, such as will enable others skilled in the art to which it appertains to make and use the same, reference being had to the accompanying drawings, forming part of this specification, in which—

Figure 1 is a diagrammatic plan view showing a clothes line attached to a series of posts and my improved reel and stretcher connected to said line. Fig. 2 is a vertical section taken through the combined reel and stretcher and showing parts on the interior of the housing in elevation. Fig. 3 is a section similar to Fig. 2, and showing the device in reverse position so that the detent is released from the ratchet wheel. Fig. 4 is a vertical section taken approximately on the line 4—4 of Fig. 2.

My invention relates to new and useful improvements in a combined reel and stretcher for clothes lines, the principal objects of my invention being first, to produce a comparatively simple, inexpensive and easily operated device wherein the reel is inclosed within a housing so that when the line is wound upon the reel it will be maintained in clean condition; second, to equip the line with a series of pulleys which are adapted to be attached to hooks on the posts or supports for the line; third, to provide simple means for actuating the reel to stretch and tighten the line after the same has been put up in proper position, and fourth, to provide simple means for locking the reel after the line has been properly stretched, and which locking means is readily releasable when it is desired to take the line down.

With the above and other objects in view, my invention consists in certain novel features of construction and arrangement of parts hereinafter more fully described and claimed.

As shown in the drawings, my improved reel and stretcher comprises a housing 10, preferably formed of sheet metal in the shape of a box with one end open.

Rigidly fixed in any suitable manner to the outer faces of the side walls of this housing is a metal strap 11, the central portion of which extends across the end wall of the housing as designated by 12. Fixed to this portion 12 of the strap is an eye or staple 13 to which is connected a hook 14 which serves as means for attaching the housing to one end of the line when the same is to be stretched.

The reel or spool on which the clothes line winds comprises a hub to which is fixed a pair of disks 16, and said hub is mounted upon a shaft 17, the end portions of the latter being journaled for rotation in suitable bearings formed in the end portions of the strap 11 and the side walls of the housing 10.

Formed on or fixed to one end of the shaft 17 is a crank handle 18. Fixed on one end of the hub 15 immediately adjacent the corresponding side wall of the housing is a ratchet wheel 19 and adapted to engage the teeth thereof is a gravity pawl or detent 20. This pawl is pivotally mounted on a stud 20ª which is seated in one of the side walls of the housing 10.

The clothes line utilized in connection with my improved reel and stretcher is preferably a light weight rope or cable 21, and upon which is positioned a series of small pulleys 22 which are adapted to be engaged by suitable supports, such as hooks seated in posts or the like.

Assuming that the line is wound onto the reel and it is desired to position said line on posts or suitable supports, the pulley *a* on the outer end of the clothes line is attached to one of the supports, and the housing 10, manually held in front of the operator, is turned into the position shown in Fig. 3, and when thus positioned the gravity pawl 20 will automatically disengage from the ratchet wheel 19. The operator now moves away from the support to which the pulley *a* is attached, and in so doing the clothes line will unwind from the spool or reel. After the various pulleys have been attached to the various supports, the device is returned to the support to which the pulley *a* is attached, and said device is now turned upside down or into the position shown by Fig. 2, and the hook 14 is attached to a ring *b*, which latter is carried by the end of the clothes line that projects through the pulley *a*. This movement causes the pawl 20 to automatically reëngage the ratchet wheel 19, and the operator now manipulates the crank handle 18 to rotate the drum or reel to wind a portion of the line thereon. This operation stretches and tightens the line, and the unwinding drum or spool is held against reverse movement by the engagement of the pawl with the ratchet wheel. When the line is taken down, the spool is operated by means of the crank handle to wind the line and the pulleys 22 into the housing, and thus the same are maintained in a clean condition when not in use.

A clothes line reel and stretcher of my improved construction is comparatively simple, can be easily manipulated, and maintains the line and its attaching devices in clean condition, and in compact form when not in use.

It will be readily understood that minor changes in the size, form and construction of the various parts of my improved clothes line reel and stretcher may be made and substituted for those herein shown and described, without departing from the spirit of my invention, the scope of which is set forth in the appended claim.

I claim:

In a clothes line reel, a rectangular housing open at one end, a strap fixed to said housing and extending across the closed end thereof, and partially across the side walls, a hook carried by said strap, which hook is adapted to be attached to one end of a clothes line, a shaft journaled in the end portions of the strap and in the side walls of the housing, a hub fixed on said shaft within the housing, a pair of disks fixed on the ends of the hub, which disks are located within the housing and lie immediately adjacent to the side walls thereof, said hub and disks forming a spool on which is adapted to wind a pulley carrying clothes line so that the same is located wholly within the housing while not in use, a ratcheted wheel fixed on one end of the hub within the housing, and a gravity pawl pivotally mounted within the housing and adapted to engage the teeth of said ratchet wheel.

In testimony whereof I hereunto affix my signature in the presence of two witnesses, this 15th day of January, 1914.

DANIEL T. TIMBERLAKE.

Witnesses:
M. P. SMITH,
M. A. HANDEL.

Copies of this patent may be obtained for five cents each, by addressing the "Commissioner of Patents, Washington, D. C."